(12) United States Patent
Schliwa-Bertling et al.

(10) Patent No.: US 9,706,494 B2
(45) Date of Patent: *Jul. 11, 2017

(54) MOBILE STATION, CORE NETWORK NODE, BASE STATION SUBSYSTEM, AND METHODS FOR IMPLEMENTING LONGER PAGING CYCLES IN A CELLULAR NETWORK

(71) Applicant: TELEFONAKTIEBOLAGET LM ERICSSON (PUBL), Stockholm (SE)

(72) Inventors: Paul Schliwa-Bertling, Ljungsbro (SE); Mårten Sundberg, Årsta (SE); Sajal Kumar Das, Bangalore (IN); Ravitej Ballakur, Bangalore (IN); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/162,461

(22) Filed: May 23, 2016

(65) Prior Publication Data
US 2016/0269995 A1    Sep. 15, 2016

Related U.S. Application Data

(63) Continuation of application No. 14/464,554, filed on Aug. 20, 2014, now Pat. No. 9,351,251.
(Continued)

(30) Foreign Application Priority Data

Aug. 22, 2013    (IN) .......................... 2484/DEL/2013

(51) Int. Cl.
*H04W 68/00* (2009.01)
*H04W 52/02* (2009.01)
(Continued)

(52) U.S. Cl.
CPC ...... *H04W 52/0229* (2013.01); *H04B 17/318* (2015.01); *H04W 4/005* (2013.01);
(Continued)

(58) Field of Classification Search
CPC ......... H04W 52/0225; H04W 52/0229; H04W 56/001; H04W 68/02; H04W 76/048;
(Continued)

(56) References Cited

U.S. PATENT DOCUMENTS 8,260,328 B1    9/2012 Yellin et al.
8,457,112 B2    6/2013 Krishnamurthy et al.
(Continued)

FOREIGN PATENT DOCUMENTS

EP    2 574 135 A1    3/2013
EP    2 677 818 A1    12/2013
(Continued)

OTHER PUBLICATIONS

3GPP TSG GERAN #58, "Longer Paging Cycles for the MTC use case", Agenda Item: 7.2.5.3.6, Tdoc: GP-130473, Source: Telefon AB LM Ericsson, ST-Ericsson, Xiamen, P.R. China, May 13-17, 2013, the whole document.
(Continued)

*Primary Examiner* — Juan A Torres (57) ABSTRACT

A mobile station, a core network node, a base station subsystem, and various methods are described herein for implementing longer paging cycles (longer Discontinuous Reception (DRX) mode) in a cellular network which has a benefit of reducing the energy consumption of the mobile station's battery.

10 Claims, 6 Drawing Sheets

Related U.S. Application Data (60) Provisional application No. 61/888,310, filed on Oct. 8, 2013.

(51) Int. Cl.
| | |
|---|---|
| *H04W 56/00* | (2009.01) |
| *H04W 68/02* | (2009.01) |
| *H04W 48/16* | (2009.01) |
| *H04B 17/318* | (2015.01) |
| *H04W 4/00* | (2009.01) |
| H04W 76/04 | (2009.01) |

(52) U.S. Cl.
CPC ....... *H04W 48/16* (2013.01); *H04W 52/0209* (2013.01); *H04W 52/0225* (2013.01); *H04W 56/001* (2013.01); *H04W 56/0015* (2013.01); *H04W 68/02* (2013.01); *H04W 68/00* (2013.01); *H04W 76/048* (2013.01); *Y02B 60/50* (2013.01)

(58) Field of Classification Search
CPC ... H04W 48/16; H04W 68/00; H04W 68/025; H04W 52/02; H04W 68/12
USPC ........................................................ 455/458
See application file for complete search history.

(56) References Cited

U.S. PATENT DOCUMENTS

| | | |
|---|---|---|
| 2007/0064662 A1 | 3/2007 | Bultan et al. |
| 2007/0224992 A1 | 9/2007 | Dalsgaard et al. |
| 2007/0291673 A1 | 12/2007 | Demirhan et al. |
| 2008/0186892 A1 | 8/2008 | Damnjanovic |
| 2008/0225772 A1 | 9/2008 | Xu |
| 2009/0232054 A1 | 9/2009 | Wang et al. |
| 2009/0262648 A1 | 10/2009 | Chun et al. |
| 2010/0130237 A1 | 5/2010 | Kitazoe et al. |
| 2010/0184458 A1 | 7/2010 | Fodor et al. |
| 2011/0038348 A1 | 2/2011 | Borsella et al. |
| 2011/0075558 A1 | 3/2011 | Isaksson et al. |
| 2011/0195709 A1 | 8/2011 | Christensson et al. |
| 2012/0188997 A1 | 7/2012 | Zakrzewski et al. |
| 2013/0070589 A1 | 3/2013 | Diachina et al. |
| 2013/0070699 A1 | 3/2013 | Diachina et al. |
| 2013/0142178 A1 | 6/2013 | Kim et al. |
| 2013/0229931 A1 | 9/2013 | Kim |
| 2013/0235855 A1 | 9/2013 | Diachina et al. |
| 2013/0242975 A1 | 9/2013 | Krishnamurthy et al. |
| 2013/0301501 A1 | 11/2013 | Olvera-Hernandez et al. |
| 2014/0064160 A1 | 3/2014 | Verger et al. |
| 2014/0112221 A1 | 4/2014 | Verger et al. |
| 2014/0198699 A1 | 7/2014 | Makharia et al. |
| 2014/0226647 A1 | 8/2014 | Das et al. |
| 2014/0321381 A1 | 10/2014 | Guo et al. |
| 2014/0362754 A1 | 12/2014 | Moses et al. |
| 2015/0003311 A1 | 1/2015 | Feuersaenger et al. |

FOREIGN PATENT DOCUMENTS

| | | |
|---|---|---|
| GB | 2 402 301 A | 12/2004 |
| KR | 1020110057273 A | 5/2011 |
| KR | 10001241677 B1 | 3/2013 |
| WO | WO 2012/111483 A1 | 8/2012 |
| WO | WO 2012/173545 A1 | 12/2012 |
| WO | WO 2013/091505 A1 | 6/2013 |

OTHER PUBLICATIONS

3GPP TSG GERAN / WG2, TSGG#57(13)0093, "LS on requesting input on MTCe solutions", Vienna, Austria, Feb. 25-Mar. 1, 2013, the whole document.

3GPP TSG GERAN / WG2, TSGG#57(13)0249, "Reply LS on requesting input on MTCe solutions", Vienna, Austria, Feb. 25-Mar. 1, 2013, the whole document.
3GPP TS 44.018 V11.3.0 (Nov. 2012), 3rd Generation Partnership Project; Technical Specification Group GSM/EDGE Radio Access Network; Mobile radio interface layer 3 specification; Radio Resource Control (RRC) protocol (Release 11), SP-57, GP-56, available Jan. 1, 2013, the whole document.
3GPP TS 45.008 V11.4.0 (May 2013), 3rd Generation Partnership Project; Technical Specification Group GSM/EDGE Radio Access Network; Radio subsystem link control (Release 11), SP-57, GP-58, version 11.4.0, the whole document.
3GPP TS 45.002 V11.2.0 (Mar. 2013), 3rd Generation Partnership Project; Technical Specification Group GSM/EDGE Radio Access Network; Multiplexing and multiple access on the radio path (Release 11), SP-57, GP-57, available Mar. 15, 2013, the whole document.
3GPP TSG GERAN #59, "A Solution to Long Paging cycles for MTC Devices", Source: Telefon AB LM Ericsson, ST-Ericsson, Tdoc: GP-130730, Agenda Item: 7.2.5.3.6,7.1.5.2.5, Sofia, Bulgaria, Aug. 26-30, 2013, the whole document.
Bontu, "DRX mechanism for power saving in LTE" IEEE Communications Magazine, Year: 2009, vol. 47, Issue: 6 pp. 48-55.
Andreev, "Analysis of second UE DRX cycle for enhanced CELL FACH 3GPP UTRAN," 2012 4th International Congress on Ultra Modern Telecommunications and Control Systems and Workshops (ICUMT), Year: 2012 pp. 7- 11.
Jha, "Adaptive DRX configuration to optimize device power saving and latency of mobile applications over L TE advanced network" 2013 IEEE International Conference on Communications (ICC), Jun. 9-13, 2013, pp. 6210-6214.
Lei Zhou, "Performance Analysis of Power Saving Mechanism with Adjustable DRX Cycles in 3GPP L TE" IEEE 68th Vehicular Technology Conference, 2008, VTC 2008 Fall, Year: 2008, pp. 1-5.
Jie Song, "Power savings for cell search application with DRX feature in L TE" 2012 9th International Conference on Fuzzy Systems and Knowledge Discovery (FSKD), Year: 2012, pp. 2953-2956.
Sunggeun Jin, "Numerical Analysis of the Power Saving in 3GPP L TE Advanced Wireless Networks," IEEE Transactions on Vehicular Technology, Year: 2012, vol. 61, Issue: 4, pp. 1779-1785.
3GPP TS 45.002 V12.1.0 (Nov. 2013), 3rd Generation Partnership Project; Technical Specification Group GSM/EDGE Radio Access Network; Multiplexing and multiple access on the radio path (Release 12), GP-60, version 12.1.0, available Dec. 19, 2013, the whole document.
P.J. Kootsookos: "A Review of the Frequency Estimation and Tracking Problems", CRC for Robust and Adaptive Systems DSTO, Salisbury Site Frequency Estimation and Tracking Project, Feb. 21, 1999, the whole document.
Das S.: "Mobile Handset Design", WILEY, 2010, section 10.8.3, pp. 326-327.
3GPP TR 21.905 V12.0.0 (Jun. 2013), 3rd Generation Partnership Project; Technical Specification Group Services and System Aspects; Vocabulary for 3GPP Specifications (Release 12), SP-60, version 12.0.0, available Jun. 25, 2013, the whole document.
3GPP TS 41.102 V4.8.0 (Mar. 2003), 3rd Generation Partnership Project; Technical Specification Group Services and System Aspects; GSM Release 4 specifications (Release 4), SP-19, version 4.8.0, available Mar. 27, 2003, the whole document.
GP-131136 (Rev of GP-131108), 3GPP TSG GERAN #60, Agenda item: 7.2.5.3.7, 7.1.5.3.5, China Mobile Communication Corporation, Zhuhai, P.R.China, Nov. 18-22, 2013, the whole document.
3GPP TS 23.682 V12.1.0 (Mar. 2014), 3rd Generation Partnership Project; Technical Specification Group Services and System Aspects; Architecture enhancements to facilitate communications with packet data networks and applications (Release 12), SP-63, version 12.1.0, available Mar. 10, 2014, the whole document.
GP-131045, "A solution to long paging cycles for MTC devices" (Update of GP-130973), 3GPP TSG GERAN#60, Agenda item 7.1.5.4, 7.2.5.3.7, Source: Telefon AB LM Ericsson, Zhuhai, P.R. China, Nov. 18-22, 2013, the whole document.

MOBILE STATION, CORE NETWORK NODE, BASE STATION SUBSYSTEM, AND METHODS FOR IMPLEMENTING LONGER PAGING CYCLES IN A CELLULAR NETWORK

CLAIM OF PRIORITY

This application is a Continuation of U.S. patent application Ser. No. 14/464,554, filed on Aug. 20, 2014, which claims the benefit of priority to Indian Application No. 2484/DEL/2013, filed on Aug. 22, 2013, and U.S. Provisional Application No. 61/888,310, filed on Oct. 8, 2013. The entire contents of each of these applications are hereby incorporated by reference for all purposes.

TECHNICAL FIELD

The present invention relates to a mobile station, a core network node, a base station subsystem, and various methods for implementing longer paging cycles within a cellular network.

BACKGROUND

The following abbreviations are herewith defined, at least some of which are referred to within the following description of the prior art and the present invention.
AFC Automatic Frequency Control
ATC Automatic Time Control
BA BCCH Allocation
BCCH Broadcast Control Channel
BS-PA-MFRMS Base Station Paging Multiframes
BSIC Base Station Identification Code
CCCH Common Control Channel
CRC Cyclic Redundancy Check
DRX Discontinuous Reception
E-UTRA Evolved-Universal Terrestrial Radio Access
FCCH Frequency Correction Channel
GSM Global System for Mobile Communications
HLR Home Location Register
LA Location Area
MS Mobile Station
MTC Machine Type Communication
NAS Non Access Stratum
RA Routing Area
RSSI Received Signal Strength Indicator
SCH Synchronization Channel
TSC Training Sequence Code
UTRA Universal Terrestrial Radio Access In a Global System for Mobile Communications (GSM) network today, each registered mobile station (MS) must monitor its own paging group on the paging channel periodically with a periodicity which varies between 0.47 and 2.12 seconds and is set by the parameter BS-PA-MFRMS (see 3GPP TS 44.018 V11.3.0 (2012-11)'s chapter 10.5.2.11—the contents of which are incorporated by reference herein). The length of the paging cycle is set to achieve a balance between the acceptable responsiveness for mobile terminated call set-up procedures and the MS battery lifetime. Today, the MS uses a significant amount of power decoding and processing received information which is not intended for it when it periodically checks for incoming paging messages and performs other idle mode activities. This leads to significant overhead which quickly drains the MS battery especially for MSs which are characterized as machine type communication (MTC) devices.

SUMMARY

A mobile station, a core network node, a base station subsystem, and various methods for implementing paging cycles in a cellular network to address problems with existing systems are described in the present application. Advantageous embodiments of the mobile station, the core network node, the base station subsystem, and various methods are further described in the present application.

In one aspect, a mobile station is configured to implement paging cycles in a cellular network. The mobile station comprising at least one processor, and at least one memory that stores processor-executable instructions, wherein the at least one processor interfaces with the at least one memory to execute the processor-executable instructions, whereby the mobile station is operable to determine if a serving cell in the cellular network is acceptable to stay camped-on. If the result of the determination is that the serving cell is acceptable to stay camped-on, then the mobile station is operable to perform a first type of synchronizing procedure (short sync up procedure) and attempt to read a radio block (e.g., paging block, CCCH block, paging message, paging notification) received per a first DRX mode, wherein the first DRX mode has a longer time period than a legacy second DRX mode. If the result of the determination is that the serving cell is not acceptable to stay camped-on or the mobile station is not able to read the received radio block during the first type of synchronizing procedure, then the mobile station is operable to perform a second type of synchronizing procedure (long sync up procedure) and attempt to read another radio block, wherein the first type of synchronizing procedure has a shorter duration than the second type of synchronizing procedure. The mobile station operating in this manner has the advantage of reducing the energy consumption of the mobile station's battery, as compared to a mobile station operating under a legacy paging cycle.

In another aspect, a method in a mobile station is for implementing paging cycles in a cellular network. The method comprises the mobile station determining if a serving cell in the cellular network is acceptable to stay camped-on. If the result of the determination is that the serving cell is acceptable to stay camped-on, then the mobile station performs a first type of synchronizing procedure (short sync up procedure) and attempts to read a radio block (e.g., paging block, CCCH block, paging message, paging notification) received per a first DRX mode, wherein the first DRX mode has a longer time period than a legacy second DRX mode. If the result of the determination is that the serving cell is not acceptable to stay camped-on or the mobile station is not able to read the received radio block during the first type of synchronizing procedure, then the mobile station performs a second type of synchronizing procedure (long sync up procedure) and attempts to read another radio block, wherein the first type of synchronizing procedure has a shorter duration than the second type of synchronizing procedure. The method has the advantage of reducing the energy consumption of the mobile station's battery since it is expected that for a large majority of the time, a mobile station will be able to determine that the serving cell is acceptable to stay camped-on and will be able to successfully read a radio block during the short sync up procedure.

In still another aspect, a base station subsystem (BSS) is configured to implement paging cycles for a mobile station in a cellular network. The BSS comprising at least one processor, and at least one memory that stores processor-executable instructions, wherein the at least one processor interfaces with the at least one memory to execute the processor-executable instructions, whereby the BSS is operable to receive, from a core network node in the cellular network, a message containing information the BSS needs to generate and transmit on a radio interface a radio block (e.g., paging block, CCCH block, paging message, paging notification) for the mobile station. The BSS is also operable to transmit the radio block according to a first DRX mode rather than a legacy second DRX mode in one or more cells of a paging area of the mobile station, wherein the first DRX mode has a longer time period than the legacy second DRX mode. The BSS operating in this manner has the advantage of enabling the possibility of reducing the energy consumption of the mobile station's battery.

In yet another aspect, a method in a BSS is for implementing paging cycles for a mobile station in a cellular network. The method comprises the BSS receiving, from a core network node in the cellular network, a message containing information the BSS needs to generate and transmit on a radio interface a radio block (e.g., paging block, CCCH block, paging message, paging notification) for the mobile station. The BSS also transmits the radio block according to a first DRX mode rather than a legacy second DRX mode in one or more cells of a paging area of the mobile station, wherein the first DRX mode has a longer time period than the legacy second DRX mode. The method has the advantage of enabling the possibility of reducing the energy consumption of the mobile station's battery.

In still yet another aspect, a core network node is configured to implement paging cycles for a mobile station in a cellular network. The core network node comprising at least one processor, and at least one memory that stores processor-executable instructions, wherein the at least one processor interfaces with the at least one memory to execute the processor-executable instructions, whereby the core network node is operable to identify the mobile station as being configured per a first DRX mode rather than a legacy second DRX mode, wherein the first DRX mode has a longer time period than the legacy second DRX mode. The core network node is also operable to receive downlink payload for the mobile station. Upon receipt of the downlink payload, the core network node is operable to transmit to one or more BSSs which manage cells in a paging area of the mobile station a message containing information each BSS needs to generate and transmit on a radio interface a radio block (e.g., paging block, CCCH block, paging message, paging notification) for the mobile station per the first DRX mode. The core network node operating in this manner has the advantage of enabling the possibility of reducing the energy consumption of the mobile station's battery.

In yet another aspect, a method in a core network node is for implementing paging cycles for a mobile station in a cellular network. The method comprises the core network node identifying the mobile station as being configured per a first DRX mode rather than a legacy second DRX mode, wherein the first DRX mode has a longer time period than the legacy second DRX mode. The core network node also receives downlink payload for the mobile station. Upon receipt of the downlink payload, the core network node transmits to one or more BSSs which manage cells in a paging area of the mobile station a message containing information each BSS needs to generate and transmit on a radio interface a radio block (e.g., paging block, CCCH block, paging message, paging notification) to the mobile station per the first DRX mode. The method has the advantage of enabling the possibility of reducing the energy consumption of the mobile station's battery.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

The existing 3GPP specification assumes that the requirement for reachability of each MS is time critical, i.e., communication has to be initiated as soon as possible after initial reception of an incoming paging message (paging block) within the core network. This means that each MS must spend a significant amount of energy on decoding information not intended for it when periodically checking for an incoming page each time its paging block occurs. This prevents a prolonged sleep mode in the MS. For less time critical applications, e.g., for certain types of machine type communication (MTC) applications, this time critical reachability might be unnecessary as a significant percentage of these types of applications are not expected to be especially time critical with regards to the downlink communication mechanism being used for payload delivery because the payload itself is not very time critical. Hence, if the paging group monitoring is performed more infrequently by specific types of MSs (e.g., MTC devices) that require less time critical communication, then less energy would be consumed by these MSs in these cases. The present application addresses the problem of excessive power consumption by these specific types of MSs in which battery power is a major bottleneck for their operation (e.g., they may not have access to external power) due to the unnecessary time critical management of downlink communication (i.e., paging group monitoring) by not requiring a time critical paging mechanism for cases where the fast delivery of downlink payload is not necessary. In other words, the disclosed techniques reduce energy consumption of these specific types of MSs while in idle mode, which leads to a significant decrease in the rate that the battery power in the MSs is drained. A detailed discussion regarding these techniques in various embodiments is provided below with respect to FIGS. 1-6.

Figure 1:
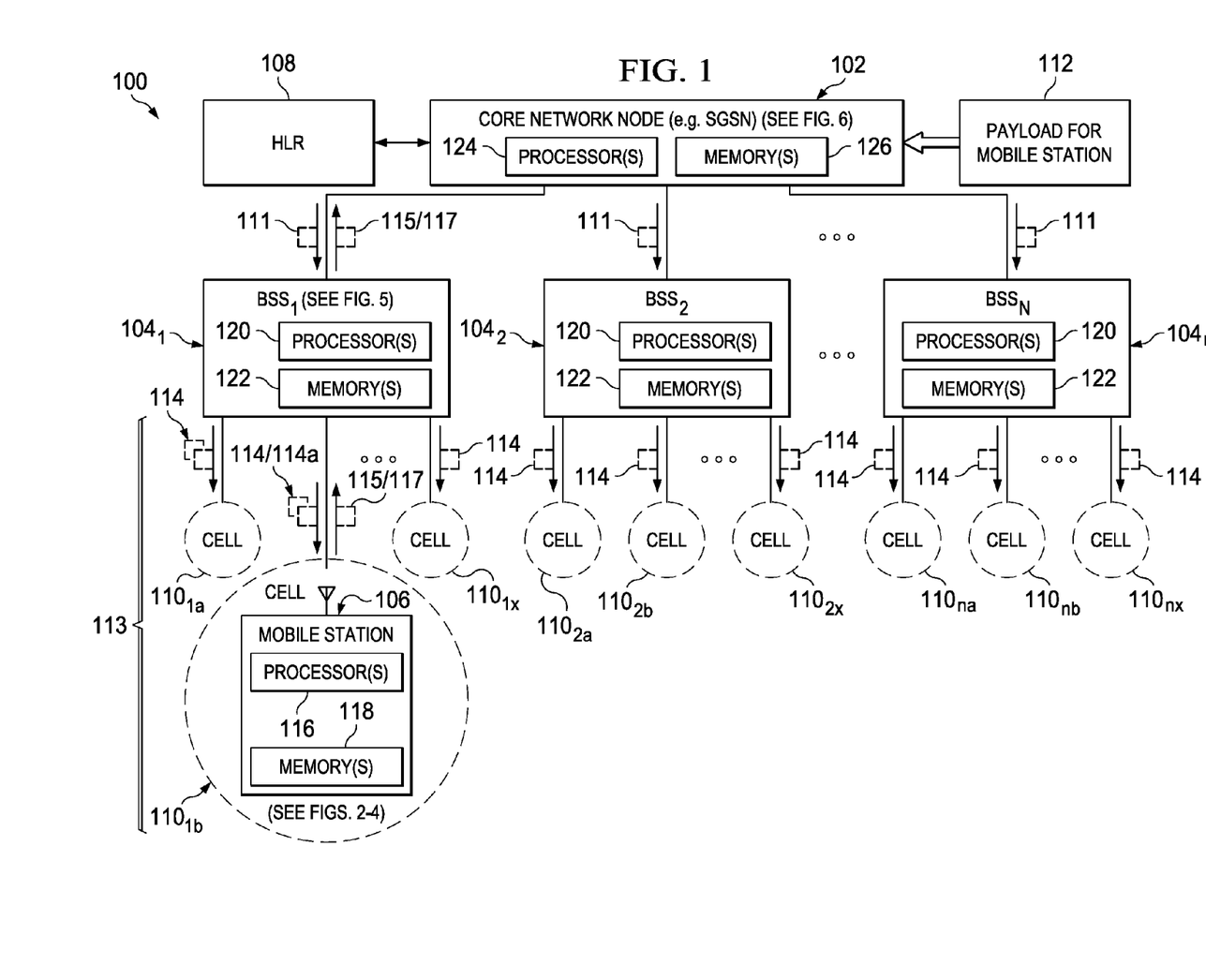
FIG. 1 is a diagram of an exemplary cellular network which is used to help describe how a core network node (e.g., SGSN), multiple BSSs, and a mobile station (e.g., MTC device) are configured to implement paging cycles which are longer than in the past in accordance with different embodiments of the present invention.

Referring to FIG. 1, there is a diagram of an exemplary cellular network 100 which is used to help describe how a core network node 102 (e.g., SGSN 102), multiple BSSs $104_1, 104_2 \ldots 104_n$, and a mobile station 106 are configured to implement paging cycles with a longer duration than in the past in accordance with different embodiments of the present invention. The exemplary cellular network 100 comprises at least the core network node 102 (e.g., SGSN 102) which interfaces with a HLR 108 and the multiple BSSs $104_1, 104_2 \ldots 104_n$. In this example, the BSS $104_1$ manages cells $110_{1a}, 110_{1b} \ldots 110_{1x}$. The BSS $104_2$ manages cells $110_{2a}, 110_{2b} \ldots 110_{2x}$. The BSS $104_n$ manages cells $110_{na}, 110_{nb} \ldots 110_{nx}$. In this example, only one mobile station 106 has been shown which is located in cell $110_{1b}$ and is being serviced by BSS $104_1$. However, it should be appreciated that any number of mobile stations 106 can be supported and can be located in one or more of the cells $110_{1a}, 110_{1b} \ldots 110_{1x}, 110_{2a}, 110_{2b} \ldots 110_{2x}$, and $110_{na}, 110_{nb} \ldots 110_{nx}$). Further, it should be appreciated that the cellular network 100, the core network node 102 (e.g., SGSN 102), the BSSs $104_1, 104_2 \ldots 104_n$, the mobile station 106 etc. . . . all contain components and have functionalities which are well known in the field, but for clarity, only those components and functionalities which are needed to explain and enable the disclosed techniques which have been described herein. A detailed discussion regarding the basic concepts of the disclosed novel techniques is provided next and then a detailed discussion is provided with respect to FIGS. 2-6 to explain how the mobile station 106, the BSSs $104_1, 104_2 \ldots 104_n$, and the core network node 102 (e.g., the SGSN 102) are configured to implement paging cycles which have a longer duration than in the past in accordance with possible different embodiments.

In regards to the basic concept, a longer paging cycle (long DRX mode) is introduced for MSs 106 (e.g., MTC devices 106) which are used for less time critical communications to primarily save the battery power of those MSs 106. These MSs 106 would be identified by the core network node 102 at registration (e.g., based on information included in registration related NAS signaling or based on subscription information maintained by the HLR 108), such that the core network node 102 is aware of the device type and the presently set DRX period (i.e., paging cycle) for those MSs 106. Further, the core network node 102 takes appropriate actions whenever downlink payload 112 becomes available for a specific one of these MSs 106 and transmits to the set of BSSs $104_1, 104_2 \ldots 104_n$, which are managing cells $110_{1a}, 110_{1b} \ldots 110_{1x}, 110_{2a}, 110_{2b} \ldots 110_{2x}$, and $110_{na}, 110_{nb} \ldots 110_{nx}$ in the applicable paging area 113 for the specific MS 106, a message 111 containing information needed by the BSSs $104_1, 104_2 \ldots 104_n$ to generate and transmit on a radio interface a radio block 114 (e.g., paging block 114, paging message 114, paging notification 114, CCCH block 114) for the mobile station 106.

The MS 106, while in idle mode, wakes periodically and performs the necessary tasks specific for idle mode including checking for receipt of the radio block 114 and then returns to sleep mode. In the sleep mode, the MS 106 cuts the clock to most of its modules and thereby operates in a power saving mode. The longer the sleeping period, the more the power is saved. Hence, to maximize the power saved by the MS 106 during the power saving mode, the preferred option would be to prolong the sleep duration (e.g., increase the time between consecutive instances of waking up to perform the idle mode tasks). The disclosed techniques perform this functionality.

To appreciate the benefits of the present invention, one should realize that the traditional MS once it has camped to a suitable serving cell would perform the following steps:

(1) Read BCCH information for BA list: MS reads BCCH to get neighbor cell list.

(2) Make RSSI measurements for the neighbor cells identified using step (1).

(3) BSIC Identification: read FCCH and SCH of the cells in the cell data base (neighbor+serving) to identify the cell-ID. If a new cell is found, it is added to the cell data base for periodic monitoring.

(4) BSIC reconfirmation: re-confirms cell-ID of the already detected neighbor and serving cells by reading SCH.

(5) Cell reselection: camp to the best detected neighbor cell (6) LA/RA update: perform NAS procedures for updating the LA and RA as needed.

(7) AFC: does the frequency correction of the local clock.

All these tasks put a significant burden on the traditional MS in idle mode that leads to significant power consumption in order to keep the traditional MS synchronized with the network for receiving paging messages in a time critical manner. The present disclosed techniques reduce this overhead by eliminating the execution of the above tasks on a periodic basis and instead having the MS 106 executing them on an as needed basis. In particular, this overhead is reduced by configuring the MS 106 such that, while it is in idle mode, there is no periodic RSSI measurement, no background neighbor cell search, no BA list reading (e.g., no BCCH reading every 30 seconds), and no SCH reading for BSIC reconfirmation every 30 seconds. Instead, the MS 106 is configured to implement the procedure as described in detail below with respect to FIGS. 2-4.

Figure 2:
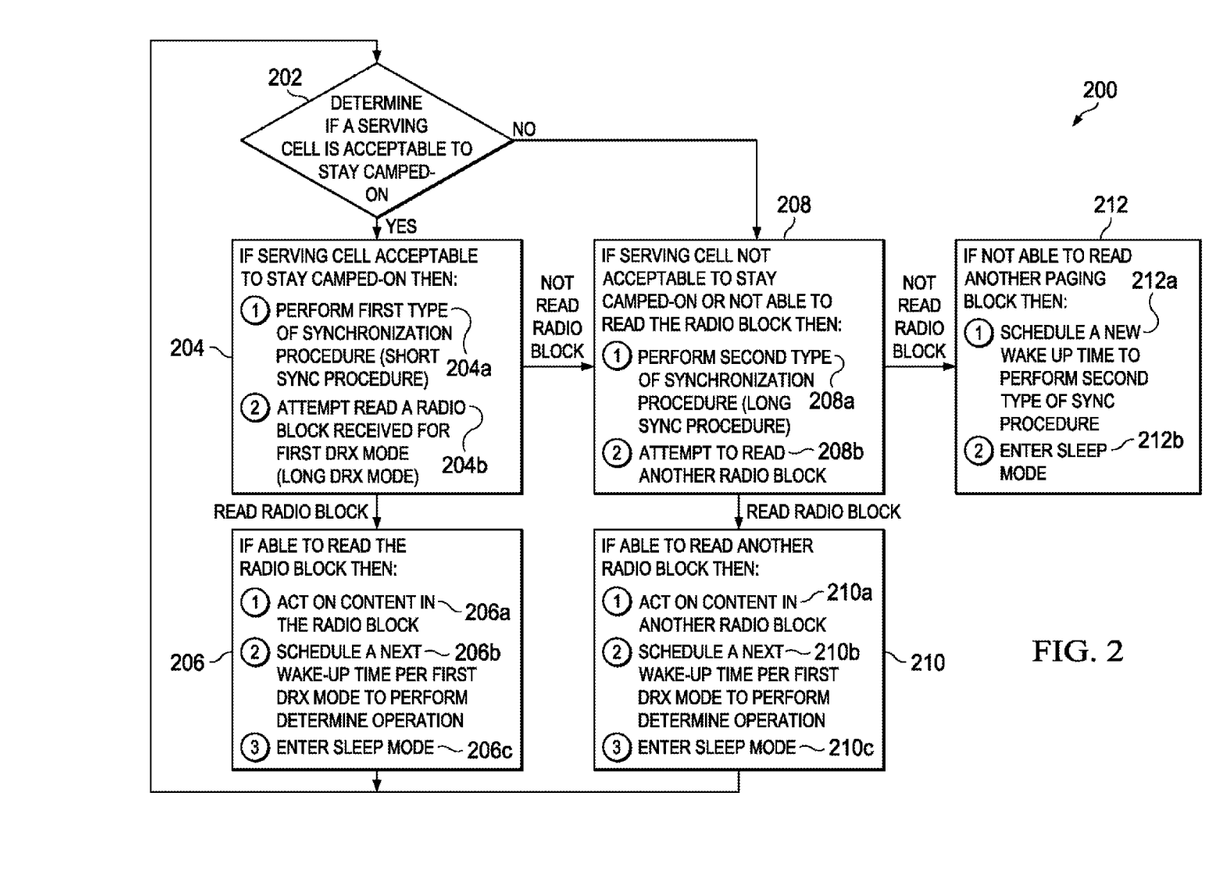
FIG. 2 is a flow chart of a method in the mobile station (e.g., MTC device) for implementing paging cycles which are longer than in the past in accordance with the present invention.

Referring to FIG. 2, there is a flow chart of a method 200 in the mobile station 106 (e.g., MTC device 106) for implementing paging cycles with a longer duration than in the past in accordance with the disclosed techniques. The mobile station 106 comprises at least one processor 116 and at least one memory 118 that stores processor-executable instructions, wherein the at least one processor 116 interfaces with the at least one memory 118 to execute the processor-executable instructions such that the mobile station 106 is operable at step 202 to determine if a serving cell $110_{1b}$ (for example) is acceptable to stay camped-on. Further discussion is provided below on different ways that the mobile station 106 can perform step 202. If the mobile station 106 determines that the serving cell $110_{1b}$ is acceptable to stay camped-on, then at step 204, the mobile station 106 performs (step 204a) a first type of synchronizing procedure (i.e., short synchronizing procedure) and then attempts (step 204b) to read a radio block 114 (e.g., paging block 114, CCCH block 114, paging message 114, paging notification 114) received per a first DRX mode (i.e., long DRX mode), The first DRX mode has a longer time period than a legacy second DRX mode. If the mobile station 106 is able to read the received radio block 114, then at step 206, the mobile station 106 then (1) performs an action (step 206a) based on content in the received radio block 114, (2) schedules (step 206b) a next wake-up time based on the first DRX mode (i.e., long DRX mode) to perform the determination of step 202, and then (3) enters (step 206c) sleep mode. If the mobile station 106 determines that the serving cell 110$_{1b}$ is not acceptable to stay camped-on during step 202 or if the mobile station 106 is not able to read the received radio block 114 during step 204b, the mobile station 106 schedules its next wakeup according to the first DRX mode (i.e., long DRX mode) then proceeds to step 208, wherein the mobile station 106 performs (step 208a) a second type of synchronizing procedure (i.e., long synchronizing procedure) and attempts (step 208b) to read another radio block 114a (e.g., another CCCH block 114a). If the mobile station 106 is able to read the another received radio block 114a during step 208b, then at step 210, the mobile station 106 then (1) performs an action (step 210a) based on content in the another received radio block 114a, (2) schedules (step 210b) a next wake-up time based on the first DRX mode to perform the determination of step 202, and then (3) enters (step 210c) sleep mode. If the mobile station 106 is not able to read the another received radio block 114a during step 208b, then at step 212, the mobile station 106 (1) schedules (step 212a) a next wake-up time based on the first DRX mode to perform the second type of synchronizing procedure and then (2) enters (step 212b) sleep mode. Detailed descriptions of two exemplary embodiments of method 200 are described next with respect to FIGS. 3 and 4.

Figure 3:
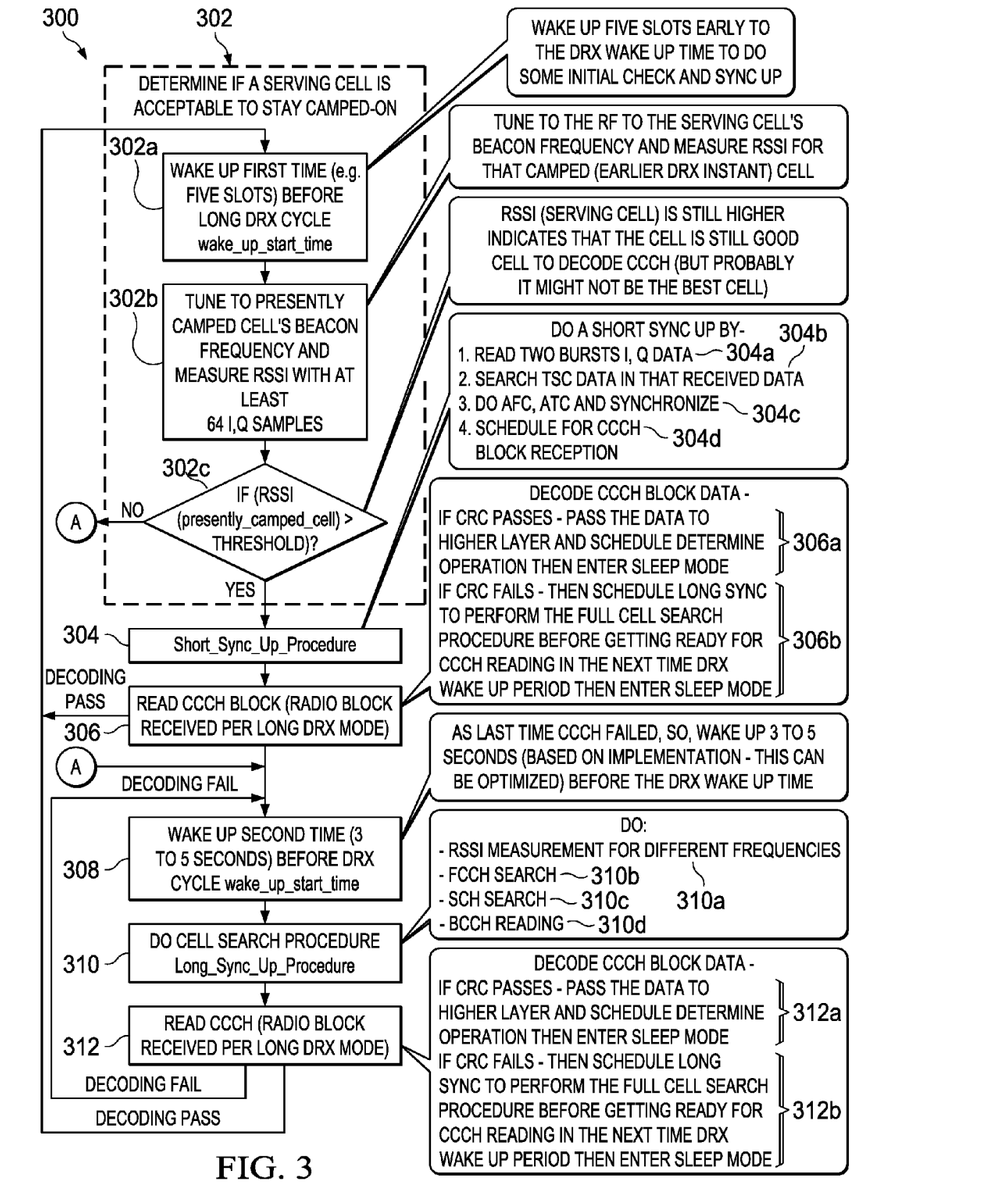
FIG. 3 is a flow chart of a method in the mobile station (e.g., MTC device) for implementing paging cycles with a longer duration than in the past in accordance with an embodiment of the present invention.

Referring to FIG. 3, there is a flow chart of a method 300 in the mobile station 106 (e.g., MTC device 106) for implementing paging cycles with a longer duration than in the past in accordance with an embodiment. The mobile station 106 comprises at least one processor 116 and at least one memory 118 that stores processor-executable instructions, wherein the at least one processor 116 interfaces with the at least one memory 118 to execute the processor-executable instructions such that the mobile station 106 is operable at step 302 to determine if a serving cell 110$_{1b}$ (for example) is acceptable to stay camped-on. For example, the mobile station 106 can perform step 302 as follows: (1) wake-up (step 302a) a predetermined first time (e.g., five slots before DRX cycle wake-up time) before a start time of a paging cycle based on the first DRX mode, which has a longer time period than a legacy second DRX mode; (2) tune (step 302b) to a radio frequency of a beacon channel of the serving cell 110$_{1b}$ and measure a RSSI of the beacon channel from the serving cell 110$_{1b}$; and (3) compare (step 302c) the RSSI to a threshold value. If the RSSI is greater than the threshold value, then the serving cell 110$_{1b}$ is acceptable to stay camped-on. Otherwise, if the RSSI is less than the threshold value, then the serving cell 110$_{1b}$ is not acceptable to stay camped-on.

If the mobile station 106 determines that the serving cell 110$_{1b}$ is acceptable to stay camped-on, then at step 304, the mobile station 106 performs a first type of synchronizing procedure (i.e., short synchronizing procedure). For example, the mobile station 106 can perform the first type of synchronizing procedure as follows: (1) read (304a) a predetermined number of bursts from a received beacon channel of the serving cell 110$_{1b}$; (2) search (304b) for a Training Sequence Code (TSC) in the read bursts to confirm cell identification of the serving cell 110$_{1b}$; (3) perform (304c) Automatic Frequency Control (AFC) operations and Automatic Time Control (ATC) operations; and (4) schedule (304d) for reception of the radio block 114. After step 304, the mobile station 106 performs step 306 and attempts to read the radio block 114 (e.g., CCCH block 114). If the mobile station 106 is able to read the received radio block 114 (e.g., able to decode the radio block 114 and CRC passes), then at step 306a, the mobile station 106 then (1) performs an action based on content in the received radio block 114 (e.g., passes the data to a higher layer), (2) schedules a next wake-up time based on the first DRX mode (i.e., long DRX mode) to perform the determination of step 302, and then (3) enters sleep mode. If the mobile station 106 is not able to read the received radio block 114 (e.g., not able to decode the radio block 114 or the CRC does not pass), then at step 306b, the mobile station 106 then schedules the second type of synchronizing procedure (i.e., long synchronizing procedure) to perform the full cell search procedure before getting ready for the radio block reading (i.e., CCCH reading) in the next time DRX wake-up period based on the first DRX mode, and then enters sleep mode.

If the mobile station 106 determines that the serving cell 110$_{1b}$ is not acceptable to stay camped-on during step 302 (FIG. 3's numeral "A" which indicates the connection between step 302c and step 308) or if the mobile station 106 is not able to read the received radio block 114 during step 306, then at step 308, the mobile station 106 wakes-up a predetermined second time (e.g., 3 to 5 seconds before the DRX cycle wake-up time) before a start time of a next paging cycle based on the first DRX mode to perform, at step 310, the second type of synchronizing procedure. For example, the mobile station 106 can perform the second type of synchronizing procedure as follows: (1) perform (step 310a) Received Signal Strength Indicator (RSSI) measurement for different frequencies; (2) perform (step 310b) Frequency Correction Channel (FCCH) search; (3) perform (step 310c) Synchronization Channel (SCH) search; and (4) read (step 310d) Broadcast Control Channel (BCCH) information. After step 310, the mobile station 106 at step 312 attempts to read another radio block 114a (e.g., another CCCH block 114a). If the mobile station 106 is able to read the another received radio block 114a (e.g., decode the radio block 114a and CRC passes), then at step 312a, the mobile station 106 then (1) performs an action based on content in the another received radio block 114a (e.g., passes the data to a higher layer), (2) schedules a next wake-up time based on the first DRX mode to perform the determination of step 302, and then (3) enters sleep mode. If the mobile station 106 is not able to read (e.g., not able to decode the another radio block 114a or the CRC does not pass) the received radio block 114 then proceed to step 312b, wherein the mobile station 106 then schedules the second type of synchronizing procedure (i.e., long synchronizing procedure) to perform the full cell search procedure before getting ready for another radio block reading (e.g., CCCH reading) in the next time DRX wake-up period based on the first DRX mode, and then enters sleep mode. The method 300 is further described next.

Once the long DRX period is set, the mobile station 106 will only wake up, e.g., 5 slots earlier than its nominal long DRX paging block 114 (determined according to the actual long DRX wakeup time) is scheduled to be received from its serving cell 110$_{1b}$ (for example) in order to perform some limited initial check and sync up operations, as illustrated in steps 302 and 302a. The mobile station 106 will thereby verify whether it is already in-sync with the same serving cell $110_{1b}$ the mobile station 106 was camping on when it last successfully performed these limited operations. When the limited operations are performed, the serving cell $110_{1b}$ might not actually be the best cell at that point, but if the mobile station 106 is still synchronized with the serving cell $110_{1b}$, then the mobile station 106 will proceed. The steps corresponding to these limited operations are as below:

(1) Tune to the radio frequency (RF) of the serving cell's beacon frequency and measure RSSI thereon (step 302b).

(2) Compare and determine whether the RSSI of the serving cell $110_{1b}$ is still higher than a threshold or not (step 302c).

(3) If the result of step (2) is yes, that indicates that the mobile station 106 can continue with its current serving cell $110_{1b}$ and perform the following:

a. Perform a short sync up procedure, where the mobile station 106 will search the TSC number in any received normal burst (i.e., to confirm the cell ID has not changed since the last time the mobile station 106 successfully performed the limited set of operations) (steps 304a and 304b), perform the frequency and time correction (step 304c), then schedule the CCCH reading (i.e., the mobile station 106 schedules the reading of its nominal paging block 114 determined according to the long DRX mode)(step 304d).

b. If the CCCH reading 306a is successful (i.e., a valid radio block 114 is read), then the mobile station 106 acts accordingly and goes to sleep again after scheduling its next wakeup according to the long DRX mode wherein the mobile station 106 will wake up a few timeslots (TSs) early (e.g. 5 TSs) to perform the limited initial check and sync up operations (steps 302 and 304). Else if unsuccessful (i.e., a valid radio block 114 is not read), then the mobile station 106 schedules its next wakeup according to the long DRX mode, but the mobile station 106 will wake up much earlier (e.g., 3 to 5 seconds) before its nominal long DRX paging block 114 is scheduled to be received in order to perform the initial cell search method (i.e., what is normally executed after the mobile station powers ON) (steps 306b, 308 and 310). That means that the mobile station 106 will scan through the frequencies and, according to the measured strongest RSSI (step 310a), detect FCCH and SCH (steps 310b and 310c), and perform the proper (i.e., full) cell selection operations. The mobile station 106 will perform all these steps before its nominal long DRX paging block 114 is scheduled to be received, because the mobile station 106 has awakened 3-5 seconds earlier than its nominal long DRX period. Then, the mobile station 106 schedules the CCCH reading (i.e., paging block 114 reading) and this time there is a high possibility that the CCCH reading will pass (i.e., be successful) (step 312). If the CCCH reading passes, then the mobile station 106 will go to sleep according to the long DRX mode and when it next wakes up, the mobile station 106 will only perform the limited initial check and sync up operations (steps 302 and 304), else the mobile station 106 will again schedule its next wakeup according to the long DRX mode but the mobile station 106 will wake up much earlier (e.g., 3 to 5 seconds) before its nominal long DRX paging block 114 is scheduled to be received in order to perform the initial cell search method, as illustrated in steps 312b, 308 and 310.

(4) If the result of step (2) is no, that means that the present cell $110_{1b}$ is not suitable for signal reception, in which case the mobile station 106 schedules its next wake-up according to the long DRX mode but will wake up much earlier (e.g., 3 to 5 seconds) before its nominal long DRX paging block 114 is scheduled to be received in order to perform the initial cell search method (i.e., long sync up procedure) as discussed above in step 3b, as illustrated in steps 302, 308, 310 and 312.

As an alternative option, to allow the mobile station 106 to still have a chance to receive a radio block 114 (e.g., paging block 114, CCCH block 114, paging message 114, paging notification 114) the BSS $104_1$ (for example) might have transmitted to the mobile station 106 using the nominal long DRX block if the result of step (2) is no, then the mobile station 106 could operate in a manner that is described next with respect to FIG. 4.

Figure 4:
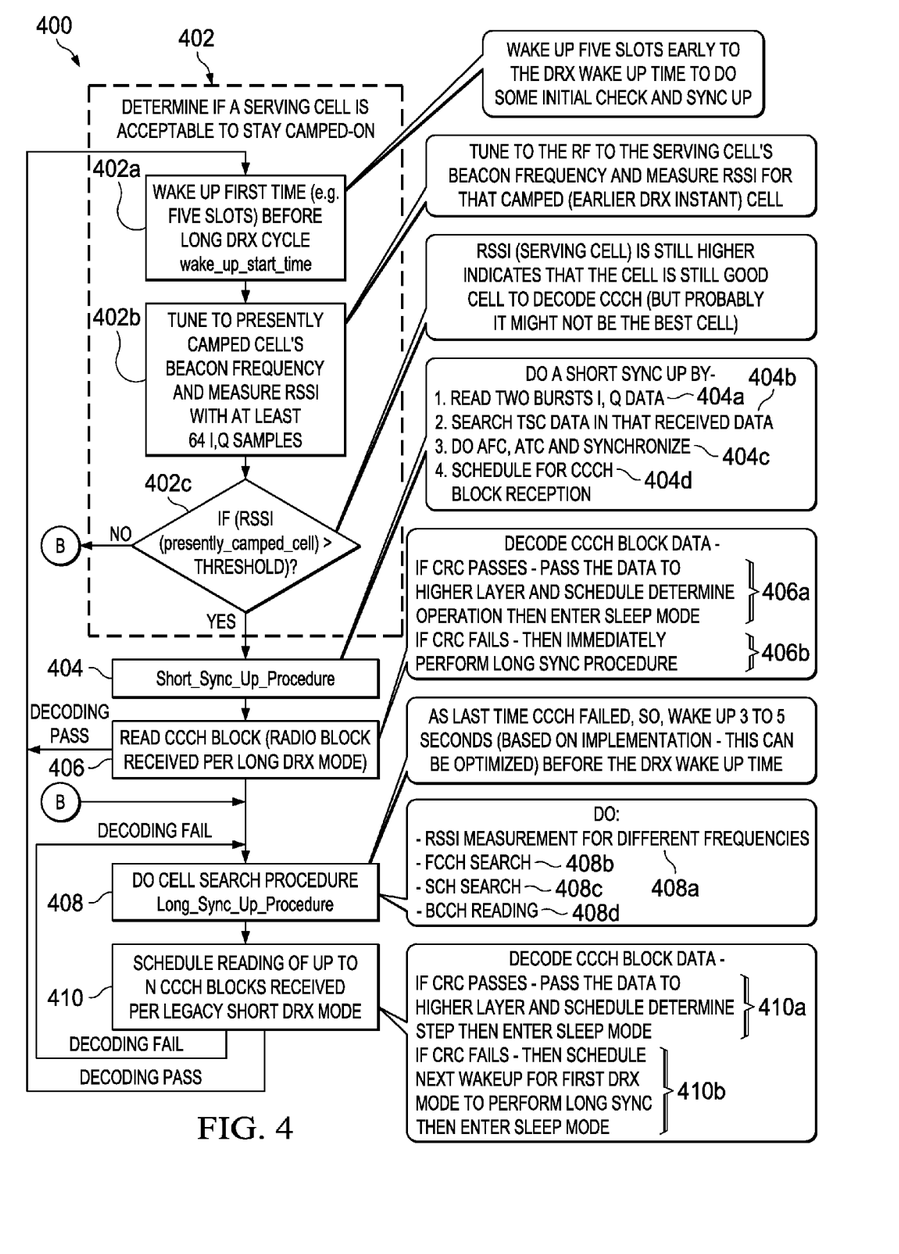
FIG. 4 is a flow chart of a method in the mobile station (e.g., MTC) for implementing paging cycles with a longer duration than in the past in accordance with another embodiment of the present invention.

Referring to FIG. 4, there is a flow chart of a method 400 in the mobile station 106 (e.g., MTC device 106) for implementing paging cycles with a longer duration than in the past in accordance with another embodiment. The mobile station 106 comprises at least one processor 116 and at least one memory 118 that stores processor-executable instructions, wherein the at least one processor 116 interfaces with the at least one memory 118 to execute the processor-executable instructions such that the mobile station 106 is operable at step 402 to determine if a serving cell $110_{1b}$ (for example) is acceptable to stay camped-on. For example, the mobile station 106 can perform step 402 as follows: (1) wake-up (step 402a) a predetermined first time (e.g., five slots before LONG DRX cycle wake-up time) before a start time of a paging cycle based on the first DRX mode, which has a longer time period than a legacy second DRX mode; (2) tune (step 402b) to a radio frequency of a beacon channel of the serving cell $110_{1b}$ and measure a RSSI of the beacon channel from the serving cell $110_{1b}$; and (3) compare (step 402c) the RSSI to a threshold value. If the RSSI is greater than the threshold value then the serving cell $110_{1b}$ is acceptable to stay camped-on. Otherwise, if the RSSI is less than or equal to the threshold value then the serving cell $110_{1b}$ is not acceptable to stay camped-on.

If the mobile station 106 determines that the serving cell $110_{1b}$ is acceptable to stay camped-on, then at step 404, the mobile station 106 performs a first type of synchronizing procedure (i.e., short synchronizing procedure). For example, the mobile station 106 can perform the first type of synchronizing procedure as follows: (1) read (step 404a) a predetermined number of bursts from a received beacon channel of the serving cell $110_{1b}$; (2) search (step 404b) for a Training Sequence Code (TSC) in the read bursts to confirm cell identification of the serving cell $110_{1b}$; (3) perform (step 404c) Automatic Frequency Control (AFC) operations and Automatic Time Control (ATC) operations; and (4) schedule (step 404d) for reception of the radio block 114. After step 404, the mobile station 106 performs step 406 and attempts to read the radio block 114 (e.g., CCCH block 114). If the mobile station 106 is able to read the received radio block 114 (e.g., able to decode the radio block 114 and CRC passes), then at step 406a, the mobile station 106 then (1) performs an action based on content in the received radio block 114 (e.g., passes the data to a higher layer), (2) schedules a next wake-up time based on the first DRX mode (i.e., long DRX mode) to perform the determination of step 402, and then (3) enters sleep mode. If the mobile station 106 is not able to read the received radio block 114 (e.g., not able to decode the radio block 114 or the CRC does not pass), then at step 406b, the mobile station 106 immediately performs the second type of synchronizing procedure (i.e., long synchronizing procedure).

If the mobile station 106 determines that the serving cell $110_{1b}$ is not acceptable to stay camped-on during step 402 (FIG. 4's numeral "B" which indicates the connection between step 402c and step 408) or if the mobile station 106 is not able to read the received radio block 114 during step 406, then at step 408, the mobile station 106 immediately performs the second type of synchronizing procedure and thereby discovers a new serving cell $110_{1a}$ (for example). For example, the mobile station 106 can perform the second type of synchronizing procedure as follows: (1) perform (step 408a) Received Signal Strength Indicator (RSSI) measurement for different frequencies; (2) perform (step 408b) Frequency Correction Channel (FCCH) search; (3) perform (step 408c) Synchronization Channel (SCH) search; and (4) read (step 408d) Broadcast Control Channel (BCCH) information. After step 408, the mobile station 106 at step 410 schedules readings of up to N radio blocks 114 (e.g., CCCH blocks 114) in the new serving cell $110_{1a}$ (for example) to be received per the legacy second DRX mode, wherein N>1. If one of the N radio blocks 114 is successfully read (step 410a), then the mobile station 106 will (1) perform an action based on content of the read one of the N radio blocks, (2) schedule a next wake-up time based on the first DRX mode to perform the determination of step 402, and then (3) enter sleep mode. Otherwise, if none of the N radio blocks 114 is successfully read (step 410b), then the mobile station 106 will (1) schedule a next wake-up time based on the first DRX mode to perform the second type of synchronizing operation (step 408), and then (2) enter sleep mode. The method 400 is further described next.

Once the long DRX period is set, the mobile station 106 will only wake up, e.g., 5 slots earlier than its nominal long DRX paging block 114 (determined according to the actual long DRX wakeup time) is scheduled to be received from its serving cell $110_{1b}$ (for example) in order to perform some limited initial check and sync up operations, as illustrated in steps 402 and 402a. The mobile station 106 will thereby verify whether it is already in-sync with the same serving cell $110_{1b}$ it was camping on when it last successfully performed these limited operations. When the limited operations are performed, the serving cell $110_{1b}$ might not actually be the best cell at that point, but if the mobile station 106 is still synchronized with the serving cell $110_{1b}$, then the mobile station 106 will proceed. The steps corresponding to these limited operations are as below:

(1) Tune to the RF of the serving cell's beacon frequency and measure RSSI thereon (step 402b).

(2) Compare and determine whether the RSSI of the serving cell $110_{1b}$ is still higher than a threshold or not (step 402c).

(3) If the result of step (2) is yes, that indicates the mobile station 106 can continue with its current serving cell $110_{1b}$ and perform the following:

a. Perform a short sync up procedure, where the mobile station 106 will search the TSC number in any received normal burst (i.e., to confirm the cell ID has not changed since the last time the mobile station 106 successfully performed the limited set of operations) (steps 404a and 404b), perform the frequency and time correction (step 404c), then schedule the CCCH reading (i.e., the mobile station 106 schedules the reading of its nominal paging block 114 determined according to the long DRX mode)(step 404d).

b. If the CCCH reading is successful (i.e., a valid radio block 114 is read), then the mobile station 106 acts accordingly and goes to sleep again after scheduling its next wakeup according to the long DRX mode, wherein the mobile station 106 will wake up a few TSs early (e.g., 5 TSs) to perform the limited initial check and sync up operations (steps 402 and 404).

4. If the CCCH reading of step 3a is unsuccessful (i.e., a valid radio block 114 is not read) or if the result of step (2) is no, which means that the present cell $110_{1b}$ is not suitable for signal reception, then the mobile station 106 could proceed to (1) immediately perform the initial cell search method (i.e., second synchronization procedure, long synchronization procedure)(step 408) and thereby discover a new serving cell $110_{1a}$ (for example), and (2) then schedule the reading up to N paging blocks 114 in the new serving cell $110_{1a}$, for example, determined according to its short DRX mode (i.e., legacy DRX mode) on the CCCH where N can have a default value (e.g., 2) or be transmitted as part of system information on the BCH of the new serving cell $110_{1a}$ (step 410).

This means that each BSS $104_1, 104_2 \ldots 104_n$ which is managing cells $110_{1a}, 110_{1b} \ldots 110_{1x}, 110_{2a}, 110_{2b} \ldots 110_{2x},$ and $110_{na}, 110_{nb} \ldots 110_{nx}$ in the applicable paging area 113 will, after transmitting an initial page 114 (e.g., radio block 114, CCCH block 114) according to the long DRX mode in each cell $110_{1a}, 110_{1b} \ldots 110_{1x}, 110_{2a}, 110_{2b} \ldots 110_{2x},$ and $110_{na}, 110_{nb} \ldots 110_{nx}$ of the paging area 113, and determining that a corresponding page response 115 was not received, then repeat the transmitting of the page 114 up to 'N' times in each of these cells $110_{1a}, 110_{1b} \ldots 110_{1x}, 110_{2a}, 110_{2b} \ldots 110_{2x},$ and $110_{na}, 110_{nb} \ldots 110_{nx}$ according to the short DRX mode starting 'X' seconds after determining that the BSS 104 did not receive a page response 115 for the initial page 114, where 'X' reflects the amount of time the mobile station 106 needs to perform the initial cell search method (i.e., second synchronization procedure, long synchronization procedure. A detailed description about the BSS $104_1$ (for example) performing this particular functionality is described below with respect to FIG. 5's steps 502, 504 and 512 (i.e., labeled "alternative embodiment").

5. After scheduling and successfully reading a radio block 114 in one of the up to 'N' nominal short DRX mode paging blocks 114, the mobile station 106 will act on the content of that radio block 114 accordingly and then go to sleep again after scheduling its next wakeup according to the long DRX mode (step 410a). Otherwise, the mobile station 106 schedules its next wakeup according to the long DRX mode (step 410b) but will wake up much earlier (e.g., 3 to 5 seconds) before its nominal long DRX paging block and perform the initial cell search method (i.e., second synchronization procedure, long synchronization procedure) again as described above with respect to step 408.

It should be appreciated that the number of short DRX mode paging blocks 114 being transmitted between two long DRX mode paging blocks 114 is expected to be quite large, which means that even if, e.g., the mobile station 106 reads three or four short DRX mode paging blocks 114 in the new serving cell $110_{1a}$ (for example), it will still represent a dramatic reduction in the total number of paging blocks 114 read compared to what the mobile station 106 would have read over the time period spanned by a long DRX mode cycle using legacy DRX mode. This repeated transmission of paging blocks over a short interval (defined by the legacy DRX mode) after the long DRX paging cycle helps the mobile station 106 to successfully decode the paging message 114 it was unable to read within its nominal paging block. When long DRX is employed in the system, then the paging cycle will be very long. Thus, in such case, if the mobile station 106 (i.e., device) misses the paging message transmitted within its nominal paging block 114, then ideally the mobile station 106 has to wait for a long time (e.g., 1 hour or so, based on the long DRX period) to get the next paging message. As such, by reading one or more paging blocks 114 over a short interval (defined by the legacy DRX mode) occurring after its nominal paging block 114, the mobile station 106 (i.e., device) need not have to wait for the next paging block occurring according to its long DRX cycle.

In addition, it should be appreciated that how much time the mobile station 106 needs to perform the initial cell search method (i.e., second synchronization procedure, long synchronization procedure) will determine how long the BSS $104_1$, $104_2$ ... $104_n$, should wait after it determines that it has not received a response 115 to the initial page 114 and begins transmitting up to 'N' repeats of the initial page 114 according to the short DRX mode. Furthermore, if performing the initial cell search method (i.e., second synchronization procedure, long synchronization procedure) results in the mobile station 106 winding up in a different routing area, then it may also mean the mobile station 106 has moved to a different paging area, in which case the mobile station 106 will not receive any of the up to 'N' repeated pages 114, but this should not occur very often.

In view of the foregoing discussions with respect to FIGS. 2-4, one skilled in the art will appreciate that the present invention can utilize two configurations—long and short DRX modes, wherein the long DRX mode is the new inventive mode, while the short DRX mode is the legacy mode. There could be several different options for the configuration switching between long and short DRX modes, for example some options are described as below:

1. For long DRX capable devices, the core network node 102 could change the paging repetitions and duration in case the paging response 115 is not received after X amount of time.

2. In case the mobile station 106 loses synchronization while reading a paging message 114 (radio block 114), the mobile station 106 could (a) transmit an indication 117 to core network node 102 indicating the non-reception of paging message 114, and when the core network node 102 received this indication, then the core network node 102 could quickly transmit to the BSS $104_1$ (for example) a message containing information that the BSS $104_1$ needs to generate and transmit on the radio interface a radio block containing the paging message 114, or (b) transmit an indication to the BSS $104_1$ (for example), which would normally keep the paging message 114 for a little longer time than the BSS $104_1$ would for the non-long DRX capable devices (i.e., traditional mobile stations) so that on reception of the special indication 117 from the mobile station 106, then the BSS $104_1$ could retransmit the page 114 instead of involving core network node 102. A detailed description about the BSS $104_1$ (for example) performing this particular functionality is described below with respect to FIG. 5's steps 502, 504, 506, and 510 (i.e., labeled "one embodiment").

3. The BSS $104_1$ (for example) keeps track (e.g., maintains a record) of the paging messages 114 for the mobile station 106 (i.e., long DRX capable device 106) for a longer period of time than the BSS $104_1$ keeps track of a radio block (paging message) broadcast to a traditional mobile station (i.e., non-long DRX capable device). In addition, the BSS $104_1$ after transmitting the paging message 114, keeps track to see if a paging response 115 is received from the particular mobile station 106. If the BSS $104_1$ does not receive the paging response 115 from the mobile station 106 after X amount of time, then the BSS $104_1$ can retransmit the page message 114 by itself without involving the core network node 102 (e.g., SGSN 102). A detailed description about the BSS $104_1$ (for example) performing this particular functionality is described below with respect to FIG. 5's steps 502, 504, 506, and 508 (i.e., labeled "one embodiment").

Figure 5:
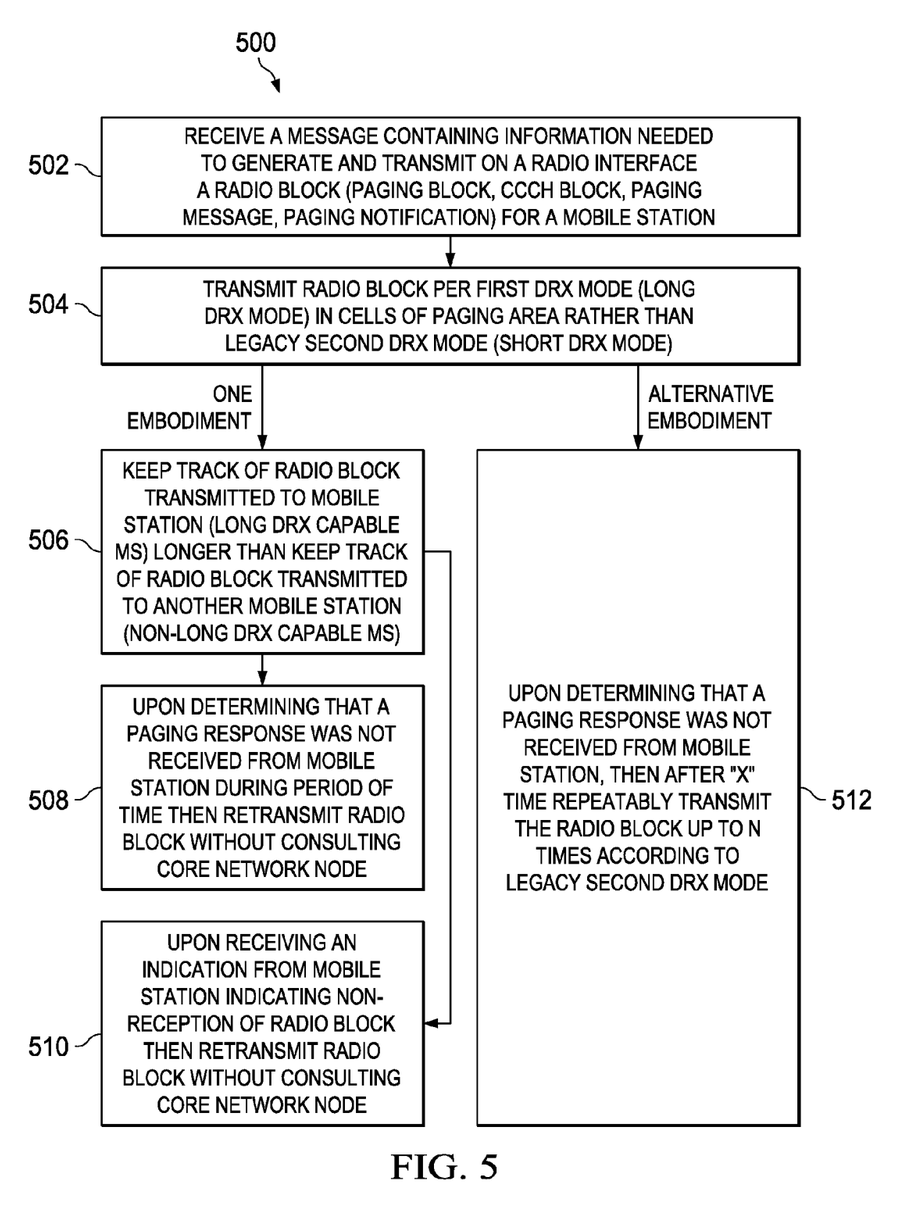
FIG. 5 is a flow chart of a method in the BSS for implementing paging cycles with a longer duration than in the past in accordance with different embodiments of the present invention.

Referring to FIG. 5, there is a flow chart of a method 500 in the BSS $104_1$ (for example) for implementing paging cycles with a longer duration than in the past in accordance with the different embodiments. The BSS $104_1$ comprises at least one processor 120 and at least one memory 122 that stores processor-executable instructions, wherein the at least one processor 120 interfaces with the at least one memory 122 to execute the processor-executable instructions such that the BSS $104_1$ is operable at step 502 to receive, from the core network node 102, a message 111 containing information the BSS $104_1$ needs to generate and transmit one radio interface a radio block 114 (e.g., paging block 114, CCCH block 114, paging message 114, paging notification 114) for mobile station 106 (see also FIG. 1). The BSS $104_1$ is further operable at step 504 to transmit (broadcast) the radio block 114 according to a first DRX mode rather than a legacy second DRX mode in one or more cells $110_{1a}$, $110_{1b}$ ... $110_{1x}$ of the paging area 113 of the mobile station 106, wherein the first DRX mode has a longer time period than the legacy second DRX mode. According to the labeled "one embodiment" section in the flowchart, the BSS $104_1$ after step 504 is operable per step 506 to keep track of the radio block 114 transmitted according to the first DRX mode to the mobile station 106 longer than the BSS $104_1$ keeps track of a radio block transmitted to another mobile station (i.e., non-long DRX capable mobile station) according to the legacy second DRX mode. Then, the BSS $104_1$ at step 508, upon determining that a paging response 115 was not received from the mobile station 106, will after a predetermined time retransmit the radio block 114 to the mobile station 106 without involving the core network node 102. The steps 502, 504, 506, 508 and 510 correspond with the mobile station 106 operation described above with respect to FIG. 3. Or, the BSS $104_1$ at step 510, upon receiving an indication 117 from the mobile station 106 indicating non-reception of the radio block 114, will retransmit the radio block 114 to the mobile station 106 without involving the core network node 102. According to the labeled "alternative embodiment" section in the flowchart, the BSS $104_1$ after step 504 is operable per step 512 such that the BSS $104_1$, upon determining that a paging response 115 was not received from the mobile station 106, will after a predetermined time repeatedly transmit the radio block 114 according to the legacy second DRX mode up to N times in the one or more cells $110_{1a}$, $110_{1b}$ ... $110_{1x}$ of the paging area 113. The steps 502, 504 and 512 correspond with the mobile station 106 operation described above with respect to FIG. 4.

Figure 6:
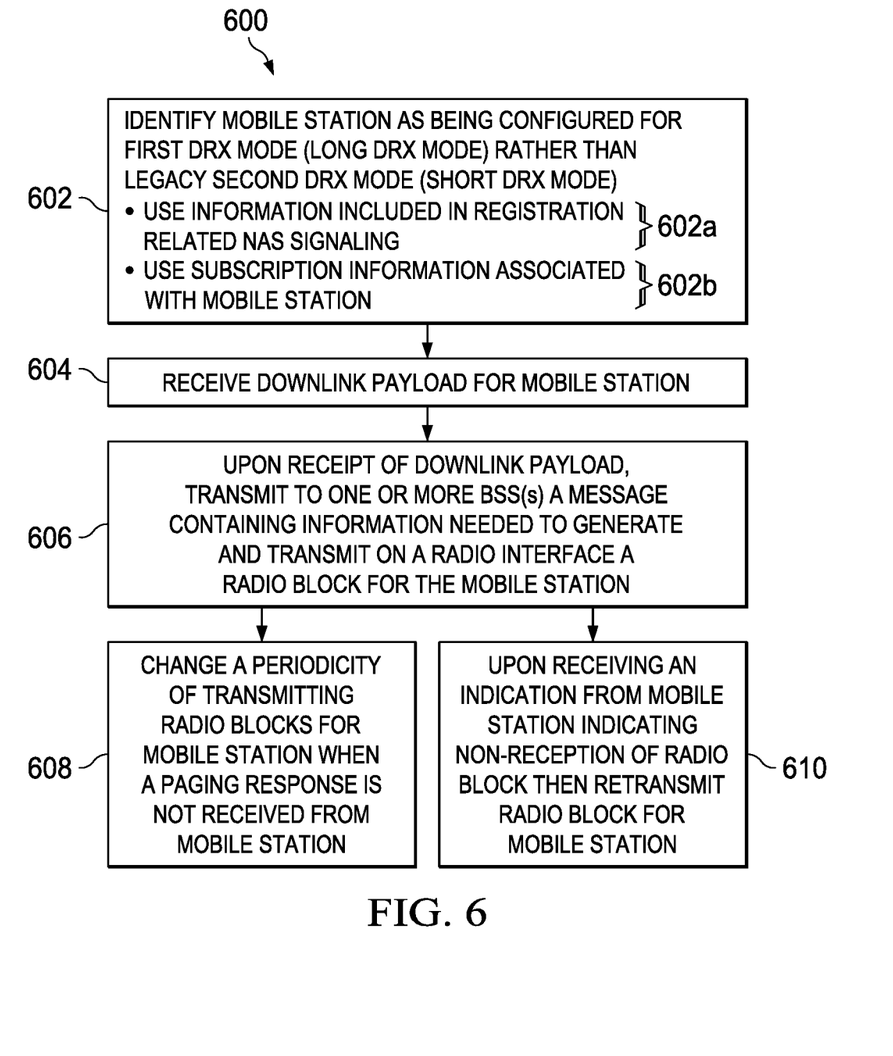
FIG. 6 is a flow chart of a method in the core network node for implementing paging cycles with a longer duration than in the past in accordance with an embodiment of the present invention.

Referring to FIG. 6, there is a flow chart of a method 600 in the core network node 102 for implementing paging cycles with a longer duration than in the past in accordance with an embodiment. The core network node 102 comprises at least one processor 124 and at least one memory 126 that stores processor-executable instructions, wherein the at least one processor 124 interfaces with the at least one memory 126 to execute the processor-executable instructions such that the core network node is operable at step 602 to identify the mobile station 106 as being configured per a first DRX mode rather than a legacy second DRX mode, wherein the first DRX mode has a longer time period than the legacy second DRX mode. For example, the core network node 102 can identify the mobile station 106 as being configured per a first DRX mode rather than a legacy second DRX mode based on (1) using (step 602a) information included in registration related Non Access Stratum (NAS) signaling, or (2) using (step 602b) subscription information associated with the mobile station 106, wherein the core network node 102 can obtain the subscription information from the HLR 108. At step 604, the core network node 102 is operable to receive the downlink payload 112 for the mobile station 106.

mobile station 106. For example, if the legacy DRX cycle is 10 minutes and the new long DRX cycle is 1000 minutes and the observation period for battery energy saving in the mobile station 106 is three days (i.e., the normal battery back time), then it was found that the energy saving ratio will be almost three thousand times. The detailed computation is provided below in TABLE #1.

TABLE #1

| Power consumption for each CCCH reading = PC_ccch (uJ) = 400 | Power consumption for each BSIC reading = PC_bsic (uJ) = 200 | Power consumption for each BA list reading = PC_ba (uJ) = 600 | Power consumption for RSSI reading for 8 neighbor cells 5 times = PC_rssi (uJ) = 1000 | Power consumption for each short sync up procedure = PC_short_sync (uJ) = 30 | Power consumption for each BSIC reading = PC_long_sync (uJ) = 10000 | Probability of 1st CCCH fail = 40% = 0.4 |
|---|---|---|---|---|---|---|
| Occurrence of CCCH reading in observation period | Occurrence of BSIC reading in observation period | Occurrence of BA reading in observation period | Occurrence in observation period | Occurrence of short Sync in observation period | Occurrence of long sync in observation period | Occurrence of CCCH reading in observation period |
| 4.32 [using proposed Long DRX method with DRX cycle of 1000 min] | 0 | 0 | 0 | 2.592 | 1.728 | 4.32 |
| 17280 [using legacy DRX method with DRX cycle of 0.25 min] | 8640 | 8640 | 51840 | | | |

DRX Cycle Legacy (in min) = 0.25 min
DRX Cycle New (in min) = 1000 min
Observation Period = 3 days = 4320 min
Power Consumption (mJ) Legacy 65664000
Power Consumption (mJ) New 19085.76
Power Saving Ratio (Legacy/New) 3440.470801

Upon receipt of the downlink payload 112, the core network node 102 performs step 606 and transmits to the BSSs $104_1$, $104_2 \ldots 104_n$ which manage cells $110_{1a}$, $110_{1b} \ldots 110_{1x}$, $110_{2a}$, $110_{2b} \ldots 110_{2x}$, and $110_{na}$, $110_{nb} \ldots 110_{nx}$ in the paging area 113 of the mobile station 106, a message 111 containing information needed to generate and transmit on a radio interface a radio block 114 (e.g., paging block 114, CCCH block 114, paging message 114, paging notification 114) for mobile station 106 per the first DRX mode. After step 606, the core network node 102 performs step 608 and changes the duration (periodicity) of transmitting messages 111 to the BSSs $104_1$, $104_2 \ldots 104_n$ that result in the transmission of radio blocks 114 for the mobile station 106) when a paging response 115 is not received from the mobile station 106 during a predetermined amount of time. Or, the core network node 102 after step 606 can perform step 610 wherein, upon receiving an indication 117 from the mobile station 106 indicating the non-reception of the radio block 114, the core network node 102 retransmits a message 111 to the BSSs $104_1$, $104_2 \ldots 104_n$ that results in the transmission of the radio block 114 for the mobile station 106. The mobile station 106 can transmit the indication 117 when the mobile station 106 has received the radio block 114 but lost synchronization such that the mobile station 106 could not finish decoding the radio block 114.

One skilled in the art should appreciate that the disclosed techniques result in a large power savings gain for the mobile station 106. For example, if the legacy DRX cycle is In normal scenarios, most of the time the mobile station 106 will perform the short synchronization process (i.e., short sync up) since the signal strength of the serving cell serving cell $110_{1b}$ (for example) does not change very frequently in normal operation. This will help to save (i.e., conserve) the battery power as the mobile station 106 will avoid having to perform the idle mode tasks most of time. The following are some additional exemplary advantages of the disclosed techniques:

(1) The mobile station 106 (and other similar devices 106) will stay for a long period of time in the sleep mode.

(2) Conventionally, a mobile station needs to wake up to perform several tasks related to idle mode that are not required with the disclosed techniques, in which the mobile station 106 will wake up only in the DRX cycle and do what is required as discussed above with respect to FIGS. 2-4. This increases the sleep duration and that saves (i.e., conserves) the batter power of the mobile station 106.

(3) The power saving ratio between the traditional method and the newly proposed method is very significant, as illustrated in TABLE #1.

(4) The mobile station 106 does not have to do the periodic RSSI measurement, BSIC conf/re-conf, and BCCH reading according to a fixed minimum periodicity. Thus, there is no need for the mobile station 106 to wake-up and perform periodic tasks according to a fixed minimum periodicity and instead the mobile station 106 will only wake up at the DRX cycle. As such the duration of the DRX cycle could be anything as the wake-up interval will, to a great extent, no longer be impacted or restricted by the need to support fixed tasks requiring a minimum periodicity of execution due to elimination of some idle mode cell re-selection related tasks and introduction of the short sync up procedure.

(5) MTC devices 106 (or sensor type of devices) will be helped, where battery power conversation is especially important.

(6) The mobile station 106 continues to be able to receive an initial page 114 that was missed on its nominal long DRX mode paging block by immediately performing the initial cell search method following the detection of an RRSI on the new serving cell $110_{1a}$ (for example) (e.g., detected using the limited initial check and sync up operations and determined to have a RSSI greater than a threshold) and then looking for up to N repeats of the initial page 114 using its short DRX mode in the new serving cell $110_{1a}$, as illustrated in FIG. 4. This may be of importance for the case where the delivery of payload 112, though not time critical in general, should still be performed within the time period spanned by a long DRX cycle, as this may be part of the contracted quality of service for a given MTC application.

(7) The consumption of energy by the mobile station 106 is reduced while in idle mode, which leads to a significant decrease in the rate that battery power of the mobile station 106 is drained.

The aforementioned mobile station 106, the core network node 102, the BSSs $104_1$, $104_2$ . . . $104_n$, and various methods 200, 300 and 400 of the present invention can also have one or more of the following features:

1. A method to reduce power usage in a terminal or mobile station 106, comprising performing wake-up and synchronization operations according to a long DRX period.

1A. The method of feature 1, further comprising on every wakeup from DRX sleep mode, the mobile station 106 verifies whether it is already connected to an earlier camped cell or if it has moved, by first measuring the received signal strength indication (RSSI) of the previously camped cell and comparing it with a threshold value.

1B. The method of feature 1A, wherein if the RSSI of the previously camped cell is greater than a threshold, the mobile station 106 assumes that it is still connected to the earlier cell and, based on the result, the mobile station 106 determines whether to perform a short sync up or a long sync up with a network.

1C. The method of feature 1, wherein in a long DRX period, the periodic RSSI measurement, BSIC conf/re-conf, broadcast control channel (BCCH) reading, AFC and similar operations are delayed or deferred to reduce battery power.

2. A method of reducing battery usage in a mobile station 106, comprising performing a faster sync up wherein the mobile station 106 reads any normal burst and performs the frequency synchronization, time synchronization using known TSC data in the burst, and then prepares for Common Control Channel (CCCH) reception, wherein this short sync up takes few slots of time.

2A. The method of feature 2, wherein the mobile station 106 does not need to wait for the frequency correction channel (FCCH).

3. A method of reducing battery usage in a mobile station 106, comprising performing a long sync up, wherein the mobile station 106 performs the same operations as it did after powering on when CCCH decoding fails or when a mobile station 106 has lost the prior cell, as detected by the algorithm or process described herein.

Further, the cellular network 100 is shown and described herein as being configured per the GSM standard, but it should be appreciated that the cellular network 100 and other components of the present invention can be configured per UTRA, E-UTRA or any other radio access technology wherein the reachability of wireless devices 106 therein has historically been based on the assumption that all deliveries of downlink packet data payload requires a rather low latency in the area of a few seconds. Finally, it should be appreciated that the present invention is not limited to mobile stations 106's that are characterized as MTC devices but could be any type of device if desired.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A base station subsystem (BSS) configured to implement paging cycles for a mobile station in a cellular network, the BSS comprising:
at least one processor; and,
at least one memory that stores processor-executable instructions, wherein the at least one processor interfaces with the at least one memory to execute the processor-executable instructions, whereby said BSS is operable to:
receive, from a core network node in the cellular network, a message containing information the BSS needs to generate and transmit on a radio interface a radio block for the mobile station;
transmit the radio block according to a first Discontinuous Reception (DRX) mode rather than a legacy second DRX mode in one or more cells of a paging area of the mobile station, wherein the first DRX mode has a longer time period than the legacy second DRX mode; and
keep track of the radio block transmitted according to the first DRX mode to the mobile station longer than the BSS keeps track of a radio block transmitted to another mobile station according to the legacy second DRX mode.

2. The BSS of claim 1, further operable to:
upon determining that a paging response was not received from the mobile station, after a predetermined time, repeatedly transmit the radio block up to N times in the one or more cells of the paging area, wherein the radio block is repeatedly transmitted up to N times according to the legacy second DRX mode.

3. The BSS of claim 1, wherein the radio block is one of the following: a paging block, a Common Control Channel (CCCH) block, a paging message, or a paging notification.

4. The BSS of claim 2, wherein the predetermined time is an amount of time the mobile station needs to perform a synchronizing procedure.

5. The BSS of claim 4, wherein the synchronizing procedure comprises the mobile station performing Received Signal Strength Indicator (RSSI) measurement for different frequencies; performing Frequency Correction Channel (FCCH) search; performing Synchronization Channel (SCH) search; and reading Broadcast Control Channel (BCCH) information.

6. A method in a base station subsystem (BSS) for implementing paging cycles for a mobile station in a cellular network, the method comprising:
- receiving, from a core network node in the cellular network, a message containing the information the BSS needs to generate and transmit on a radio interface a radio block for the mobile station;
- transmitting the radio block according to a first Discontinuous Reception (DRX) mode rather than a legacy second DRX mode in one or more cells of a paging area of the mobile station, wherein the first DRX mode has a longer time period than the legacy second DRX mode; and
- keeping track of the radio block transmitted according to the first DRX mode to the mobile station longer than the BSS keeps track of a radio block transmitted to another mobile station according to the legacy second DRX mode.

7. The method of claim 6, further comprising:
- upon determining that a paging response was not received from the mobile station, after a predetermined time, repeatedly transmitting the radio block up to N times in the one or more cells of the paging area, wherein the radio block is repeatedly transmitted up to N times according to the legacy second DRX mode.

8. The method of claim 6, wherein the radio block is one of the following: a paging block, a Common Control Channel (CCCH) block, a paging message, or a paging notification.

9. The method of claim 7, wherein the predetermined time is an amount of time the mobile station needs to perform a synchronizing procedure.

10. The method of claim 9, wherein the synchronizing procedure comprises the mobile station performing Received Signal Strength Indicator (RSSI) measurement for different frequencies; performing Frequency Correction Channel (FCCH) search; performing Synchronization Channel (SCH) search; and reading Broadcast Control Channel (BCCH) information.

* * * * *